United States Patent [19]

Holsapple et al.

[11] Patent Number: 4,957,970

[45] Date of Patent: Sep. 18, 1990

[54] PACKAGE FOR COMPOUNDING RUBBER AND COMPOUNDED RUBBER

[75] Inventors: Ronald L. Holsapple, Uniontown; John A. Kay, Stow, both of Ohio

[73] Assignee: The Goodyear Tire & Rubber Company, Akron, Ohio

[21] Appl. No.: 299,869

[22] Filed: Jan. 23, 1989

[51] Int. Cl.$^5$ ............... C08L 7/00; C08L 9/00; C08L 9/02; C08L 9/06

[52] U.S. Cl. .................. 525/99; 525/236; 525/237; 525/939; 524/505; 523/351

[58] Field of Search ............ 525/99, 938, 236, 237; 523/301, 206, 225

[56] References Cited

U.S. PATENT DOCUMENTS 2,617,775 11/1952 Newberg et al. ............... 524/578
3,930,107 12/1975 Yaeda et al. ................... 428/407
4,110,500 8/1978 Evans et al. .................... 525/22
4,112,158 9/1978 Cheekmore et al. ............. 525/92

FOREIGN PATENT DOCUMENTS 1081383 7/1980 Canada .
1544660 4/1979 United Kingdom .

*Primary Examiner*—Allan M. Lieberman
*Attorney, Agent, or Firm*—Henry C. Young, Jr.

[57] ABSTRACT

A package comprised of (A) compounding ingredients for unvulcanized rubber packaged in (B) a film comprised of syndiotactic-1,2-polybutadiene, sulfur, accelerator and retarder. The invention further relates to a compounded rubber comprised of a mixture of such package and sulfur curable rubber. The film may also contain additional selected rubbers.

3 Claims, No Drawings

PACKAGE FOR COMPOUNDING RUBBER AND COMPOUNDED RUBBER

FIELD

This invention relates to packaged materials for compounding rubber and to rubber compounded therewith.

BACKGROUND

Compounding ingredients for unvulcanized rubber are often packaged by wrapping with thermoplastic film or placing in bags thereof. Polyethylene is sometimes used for such film because of its plasticity, antiblock property, relatively low cost, and because it can be obtained in a desirable melting temperature range so that the film will melt during the rubber mixing stage.

However, use of polyethylene is generally disadvantageous because, when mixed with unvulcanized rubber, it often does not disperse sufficiently in the matrix. This may leave minute areas within the matrix of the rubber when cured, which are themselves not cured and the resultant rubber may then contain some discontinuities.

Various solutions have been proposed and sometimes utilized. Very low softening point polyethylene has been used. Other thermoplastic materials and styrene/isobutylene based materials have been taught which may, optionally, also contain ingredients which they are used to package for rubber compounding purposes. (U.S. Pat. No. 2,617,775) Compounded elastomeric styrene/butadiene/styrene block copolymer films have been used with some success (U.S. Pat. Nos. 4,110,500 and 4,112,158) and (Canadian Pat. No. 794,200), but are somewhat more costly than polyethylene and sometimes do not provide an effective packaged article when its contents include quantities of oil of the rubber-processing type. Films of ethylene/vinyl acetate copolymer have been utilized. (U.S. Pat. Nos. 4,248,348, 4,334,615 and 4,378,067). Films of syndiotactic-1,2-polybutadiene have been taught, particularly as co-extruded films, as used for packaging compounding ingredients for rubber and the compounded rubber obtained thereby (U.S. Pat. No. 4,394,473).

In one aspect, this invention provides packaged materials for compounding rubber with a film and provides rubber compounded with such a package.

DISCLOSURE AND PRACTICE OF INVENTION

In accordance with this invention a package is provided which comprises (A) compounding ingredients for unvulcanized rubber packaged in (B) a protective film having a thickness in the range of about 0.5 to about 5, preferably about 1 to about 3 mils and comprised of an unvulcanized syndiotactic-1,2-polybutadiene (SPBD) having at least 90 percent of its monomeric units in a syndiotactic-1,2-configuration and having a melting point in the range of about 70° C. to about 100° C., preferably about 75° C. to about 90° C. and containing sulfur, rubber cure accelerator(s) and rubber cure retarder(s), In the practice of this invention, it is preferred that based on 100 parts by weight of said syndiotactic polybutadiene, said film contains about 0.5 to about 3 parts by weight sulfur, about 1 to about 5 parts by weight rubber cure accelerator and about 0.1 to about 2 parts by weight rubber cure retarder.

In one aspect of this invention, the rubber portion of said film is provided as a blend composed of (1) 100 parts by weight of said syndiotactic-1,2-polybutadiene and from 0 to 50 (up to 50), preferably about 5 to about 25, parts by weight of at least one rubber selected from styrene-butadiene-styrene block copolymer, high vinyl polybutadiene and trans 1,4-polybutadiene.

An important aspect of this invention is the co-curability at a comparable cure rate of the film with the rubber with which it is mixed for the compounding of the said rubber. This feature is appropriately combined with the required melting point range of the syndiotactic polybutadiene (so that the polybutadiene will suitably melt during the rubber mixing stage and disperse therein). The invention is also directed to the use of such syndiotactic polybutadiene for the film because of its observed ability to retain oils which may be contained in the compounding ingredients the film is used to package.

The term sulfur as used for the film is intended to also include sulfur donors which is a well known technique and source of sulfur for curing rubber.

Accelerators are used with the sulfur to cause the film to cure at an effective rate with the sulfur curative. Such technology is well known to those having skill in such art.

It is important that the cure system is included within the film itself rather than relying on curing of the film by diffusion of curatives from the compounded rubber. Such "diffusion curing" is considered as being excessively inefficient.

The retarder is used to aid in retarding or preventing an appreciable amount of pre-curing of the film during its processing stage—such as, for example, while extruding the film material through an extruder die to form the film itself and to form bags thereof prior to packaging the compounding ingredients. The use of retarders and retarder technology to retard and/or prevent pre-curing of rubber is well known to those having skill in such art.

The syndiotactic polybutadiene rubber is well known to those having skill in such art. It is sometimes referred to as a thermoplastic polymer or rubber, however, it is observed to cure to form a rubber matrix within a rubber compound. It is required to have the relatively low melting point temperature range to enable it to be readily dispersed with the rubber during the process. Processes for preparing syndiotactic-1,2-polybutadienes may be found in U.S. Pat. Nos. 3,901,868 and 4,506,031. The melting point may be conveniently determined by differential scanning calorimeter (dsc) at a heating rate of about 10° C./minute.

The styrene-butadiene-styrene block copolymers are well known to those having skill in such art (see U.S. Pat. Nos. 4,110,500 and 3,281,382) as are the high vinyl polybutadienes and trans 1,4-polybutadienes. The high vinyl polybutadienes considered are those having a 50-90 percent vinyl 1,2-configuration.

It is understood that the film composite of this invention desirably can contain and include various typical lubricants, fillers, pigments and dyes and stabilizers and is conventionally required to contain a minimal amount of antiblock agent(s) sufficient to provide an antiblock quality to the surface of the film as is well known to those having skill in such art.

Thus, in the practice of this invention, a method of compounding rubber is provided and the resulting compounded rubber, which comprises mixing unvulcanized rubber, particularly high unsaturation rubber, with the package of this invention containing conventional rubber compounding ingredients, to be followed by sulfur curing said prepared mixture of rubber, packaging film and packaged ingredients. The invention is particularly applicable where the compounding ingredients contain about 0.5 to about 10 and even up to 20 weight percent rubber processing oil.

The packaging film of this invention, optionally or generally containing conventional-type antiblock agent(s), is desirably able to be pulled apart from itself after two sides being pressed together, without appreciably destroying the film itself.

In the practice of this invention, the film can be formed, for example, by extrusion methods well known to those having skill in such art.

Various rubber compounding ingredients including resins such as hydrocarbon resins can be packaged according to this invention and then compounded with unvulcanized rubber. Representative examples of the various compounding ingredients are fillers, such as clay, silicates, calcium carbonate and the like; accelerators such as, for example, cadmium diethyldithiocarbamate, tetramethylthiuram disulfide, benzothiazyl disulfide and the like antioxidants, such as, for example, the well-known substituted thioesters and amine type antiozonants, such as aniline derivatives, diamines and thioureas; curatives such as, for example, sulfur, sulfur providing compounds and peroxides, ultraviolet agents such as substituted benzo-triazoles and substituted benzophenones color pigments, such as iron oxide, titanium dioxides and organic dyes: reinforcing pigments, such as carbon black, and hydrated silicon compounds: and processing aids, such as silicon dioxide, pumice, stearate and rubber processing oils as well as stearic acid and zinc oxide.

In this manner, the term "packaged" relates to bagged compounding ingredients, and particularly to mixtures thereof containing about 0.5 to about 10 and even up to about 20, preferably about 0.5 to about 6, weight percent rubber processing oil. Such compounding ingredients, even when containing the rubber processing oil, are preferably and typically relatively free flowing without substantial sticking together to impede their flow.

Representative examples of rubber compounded with the packages of this invention are sulfur curable rubbers which include natural rubber, synthetic cis-1,4-polyisoprene, polybutadiene including high vinyl polybutadiene, rubbery butadiene/styrene copolymers, styrene/isoprene rubbers, styrene/isoprene/butadiene rubbers, and rubbery butadiene/acrylonitrile copolymers. All of such rubbers are of high unsaturation type. Namely, they contain an appreciable amount of carbon-to-carbon double bonds therein which are conventionally sulfur curable. Although this invention is primarily directed to the packaging of compounding ingredients for high unsaturation rubbers, the low unsaturation type can also be used if desired. Representative of such low unsaturation rubbers are butyl rubber, which is typically a copolymer containing a major amount of isobutylene and a minor amount of isoprene, halobutyl rubber, as well as rubbery terpolymers of ethylene/propylene and a minor amount of non-conjugated diene.

Films in this invention have been observed to disperse readily when mixing with a rubber compound using conventional equipment. Even if complete dispersion might not be achieved, discontinuities in the compounded rubber from the film, when cured, are minimized because of the film's co-curability with its self contained cure system at a comparable cure rate with the unsaturated unvulcanized rubbers with which it is mixed. As hereinbefore pointed out, an important key to this invention and for this effect is that the film contains its own cure system.

The practice of this invention is further illustrated by reference to the following example which is intended to be representative rather than restrictive of the scope of the invention. Unless otherwise indicated, all parts and percentages are by weight.

EXAMPLE I

A film having a thickness of about 2 mils was prepared by milling and pressing and was comprised of the recipe shown in Table 1. Alternatively, the film could have been formed by extrusion under suitable conditions including suitable temperatures.

TABLE 1

| Material | Parts |
|---|---|
| SPBD[1] | 100 |
| Sulfur | 1.5 |
| Accelerator[2] | 5 |
| Retarder[3] | 0.5 |
| Amide Wax[4] | 1 (approx) |
| Siliceous Material[5] | 10 (approx) |

[1]Softening point = approximately 85° C. by DSC - differential scanning calorimeter
[2]Tetramethyl thiuram disulfide
[3]Thiophthalimide type material
[4]Slip Agent
[5]Antiblock aid ($SiO_2$ or Talc)

The film was evaluated or tested for (1) dispersibility by mixing the film with compounded unvulcanized rubbers at suitable mixing temperature and examined to see if the film effectively dispersed (without pieces of film being visually evident). The film was observed to pass the test.

The film was submitted to a co-curability test (2) in which a thin film (less than about 0.5 mils) was cured between two compounded rubber sheets (natural rubber/polybutadiene mixture containing sulfur cure system) for about 10 minutes at about 150° C. and the resulting sandwich of materials examined for separations or delaminations immediately after removal from the curing press (the separations, if any, would be visible as blisters on the outer rubber surface). The reason for examining immediately after curing is because any blister or separation which might occur would normally be more obvious while trapped gases are hot. The film was observed to pass the test.

A film of the syndiotactic-1,2-butadiene having a thickness of about 2 mils without the sulfur, accelerator and retarder was submitted to a containment test (3) in which bags of the film are filled with a particulate, free flowing, sulfur containing about 20% oil and suspended in a hot air oven at a temperature of about 38° C. for about 4 days. The film did not soften and rupture under such conditions and, thus, was adjudged to pass this test.

Thus, it is contended that such film (containing the sulfur, accelerator and retarder) is suitable for the preparation of bags by extrusion process, the packaging of rubber compounding ingredients therewith and the use of such packages to mix with and compound unvulcanized rubbers for the preparation of manufactured articles.

We claim:

1. A compounded rubber prepared from a mixture of a package of compounding ingredients for unvulcanized sulfur curable rubber and unvulcanized sulfur curable rubber wherein said package comprises sulfur curable compounding ingredients for unvulcanized rubber packaged in a protective film having a thickness in the range of about 0.5 to about 5 mils and comprising an unvulcanized syndiotactic-1,2-polybutadiene (SPBD) having at least 90 percent of its monomeric units in a syndiotactic-1,2-configuration and having a melting point in the range of about 70° C. to about 100° C. and, based on 100 parts by weight of said SPBD, about 1 to about 5 parts by weight sulfur, about 0.5 to about 3 parts by weight of at least one rubber cure accelerator and about 0.1 to about 2 parts by weight of at least one rubber cure retarder.

2. The sulfur cured compounded rubber of claim 1.

3. The compounded rubber of claim 1 where said protective film further comprises about 5 to about 25 parts by weight of at least one rubber selected from styrene-butadiene-styrene block copolymer, high vinyl polybutadiene and trans 1,4-polybutadiene per 100 parts of said syndiotactic-1,2-polybutadiene.

* * * * *